United States Patent
Zhang et al.

(10) Patent No.: US 11,863,088 B2
(45) Date of Patent: Jan. 2, 2024

(54) VORTEX-INDUCED VIBRATION-BASED PIEZOELECTRICITY AND FRICTION NANOMETER POWER GENERATION COMBINED ENERGY COLLECTOR

(71) Applicant: Shanghai University, Shanghai (CN)

(72) Inventors: Dan Zhang, Shanghai (CN); Di Zhang, Shanghai (CN); Xiaowei Li, Shanghai (CN); Zhongjie Li, Shanghai (CN); Yan Peng, Shanghai (CN); Shaorong Xie, Shanghai (CN)

(73) Assignee: SHANGHAI UNIVERSITY, Shanghai (CN)

( * ) Notice: Subject to any disclaimer, the term of this patent is extended or adjusted under 35 U.S.C. 154(b) by 29 days.

(21) Appl. No.: 17/894,831

(22) Filed: Aug. 24, 2022

(65) Prior Publication Data
US 2023/0064609 A1    Mar. 2, 2023

(30) Foreign Application Priority Data

Aug. 30, 2021   (CN) .......................... 202111005186.6

(51) Int. Cl.
   H02N 1/04        (2006.01)
   H02N 2/18        (2006.01)
(52) U.S. Cl.
   CPC ............... *H02N 1/04* (2013.01); *H02N 2/186* (2013.01)
(58) Field of Classification Search
   CPC .................................. H02N 1/04; H02N 2/186
   USPC .................................................. 310/309, 310
   See application file for complete search history.

(56) References Cited

FOREIGN PATENT DOCUMENTS

| CN | 111307247 | 6/2020 |
|---|---|---|
| CN | 111884539 | 11/2020 |

OTHER PUBLICATIONS

CN-115085583 (Year: 2022).*
CN-112234861 (Year: 2021).*
Chinese Office Action for CN 202111005186.6 dated Apr. 1, 2022.

\* cited by examiner

*Primary Examiner* — Ahmed Elnakib
(74) *Attorney, Agent, or Firm* — B. Aaron Schulman, Esq.; Stites & Harbison, PLLC

(57) ABSTRACT

Disclosed is a vortex-induced vibration-based piezoelectricity and friction nanometer power generation combined energy collector. The energy collector includes a support frame, a piezoelectric plate, a cylinder and a solid-liquid type friction nanometer power generation assembly, wherein the support frame includes a fixed plate, a cantilever plate and a connecting plate which are sequentially connected from top to bottom, the piezoelectric plate is fixed on one side of the cantilever plate, the solid-liquid type friction nanometer power generation assembly has an outer shell, an insulating friction inner shell and a sealing part, the outer shell having two symmetrically arranged induction electrodes, insulating layers are arranged between the butt joint faces of the two induction electrodes, the included angles between the butt joint faces of the two induction electrodes and the plane, provided with the piezoelectric plate, of the cantilever plate are not 90°.

10 Claims, 4 Drawing Sheets

VORTEX-INDUCED VIBRATION-BASED PIEZOELECTRICITY AND FRICTION NANOMETER POWER GENERATION COMBINED ENERGY COLLECTOR

CROSS REFERENCE TO RELATED APPLICATION

This patent application claims the benefit and priority of Chinese Patent Application No. 202111005186.6, filed on Aug. 30, 2021, the disclosure of which is incorporated by reference herein in its entirety as part of the present application.

TECHNICAL FIELD

The present disclosure relates to the field of clean energy, in particular to a vortex-induced vibration-based piezoelectricity and friction nanometer power generation combined energy collector.

BACKGROUND ART

The gradual depletion of non-renewable energy sources and environmental pollution problems promote the development of renewable energy technologies. Marine energy sources can produce a large number of clean and renewable energy sources. Due to recent developments in renewable energy conversion technology, many different energy converters have been built to harvest renewable energy sources. Abundant renewable low-speed flow energy is stored in oceans, rivers and channels, but is not developed on a large scale. Although a large amount of undeveloped resources and energy exist in oceans, energy in oceans, rivers and channels is not fully utilized due to current technical deficiencies, such as low conversion efficiency and complex manufacturing.

SUMMARY

In order to solve the technical problems, the present disclosure aims to provide a vortex-induced vibration-based piezoelectricity and friction nanometer power generation combined energy collector. Energy collection of low-flow-speed water flow is achieved, the advantage of low-frequency energy collection of friction nanometer power generation is fully utilized, and the utilization efficiency of energy collection is improved.

In order to achieve the purpose, the present disclosure provides the following scheme.

The present disclosure provides a vortex-induced vibration-based piezoelectricity and friction nanometer power generation combined energy collector, comprising a support frame, a piezoelectric plate, a cylinder and a solid-liquid type friction nanometer power generation assembly, wherein the support frame comprises a fixed plate, a cantilever plate and a connecting plate which are sequentially connected from top to bottom, the piezoelectric plate is fixed on one side of the cantilever plate, the cylinder is mounted at the lower part of the connecting plate, a mounting cavity is formed in the cylinder, the solid-liquid type friction nanometer power generation assembly comprises an outer shell, an insulating friction inner shell and a sealing part, the outer shell is fixed in the mounting cavity, the outer shell comprises two symmetrically arranged induction electrodes, insulating layers are arranged between the butt joint faces of the two induction electrodes, the included angles between the butt joint faces of the two induction electrodes and the plane, provided with the piezoelectric plate, of the cantilever plate are not 90°, the wire of each of the induction electrodes can penetrate through the cylinder to stretch to the outside, the insulating friction inner shell is clamped between the two induction electrodes, a first through hole is formed in the insulating friction inner shell, the insulating friction inner shell is filled with water, and the sealing part is used for sealing the first through hole.

Preferably, the cylinder comprises a first connecting assembly and two symmetrically arranged semi-cylinders, the upper ends of the two semi-cylinders are both mounted on the connecting plate, the first connecting assembly is used for connecting the two semi-cylinders, a semi-cavity is formed in the inner side of each semi-cylinder, and the two semi-cavities are in butt joint to form the mounting cavity.

Preferably, the first connecting assembly comprises a plurality of first connecting bolts, a plurality of first connecting through holes are formed in one of the semi-cylinders, a plurality of first threaded holes corresponding to the first connecting through holes are formed in the inner side surface of the other of the semi-cylinders, and each of the first connecting bolts penetrates through one of the first connecting through holes to be mounted in one of the first threaded holes.

Preferably, the energy collector further comprises a plurality of second connecting bolts, wherein a plurality of second connecting through holes are formed in the connecting plate, a plurality of second threaded holes are formed in the top surface of each of the semi-cylinders, and each of the second connecting bolts penetrates through one of the second connecting through holes to be mounted in one of the second threaded holes.

Preferably, the semi-cavity is a semi-spherical cavity, the induction electrode is in the shape of a semi-spherical shell, and the insulating friction inner shell is in the shape of a spherical shell; the inner diameter of the mounting cavity is the same as the outer diameter of the outer shell, and the inner diameter of the outer shell is the same as the outer diameter of the insulating friction inner shell.

Preferably, the lower surface of the connecting plate is provided with a cross-shaped channel, a vertical groove is formed in the upper part of the semi-cavity, the bottom of the vertical groove communicates with the semi-cylinder, two right-angled grooves are symmetrically arranged on the two sides of the semi-cylinder, the two ends of each of the right-angled grooves respectively communicate with the semi-cylinder and the vertical groove, the two vertical grooves form a vertical channel and the four right-angled grooves form two right-angled channels after the two semi-cylinders are in butt joint, the top of the vertical channel communicates with the middle part of the cross-shaped channel, and the two wires respectively pass through the two right-angled channels and stretch to the outside through the vertical channel and the cross-shaped channel.

Preferably, the insulating friction inner shell is made of an FEP material, and the induction electrode is made of copper.

Preferably, the butt joint face of each of the induction electrodes is provided with the insulating layer.

Preferably, the butt joint faces of the two induction electrodes and the plane, provided with the piezoelectric plate, of the cantilever plate are parallel to each other or coplanarly arranged.

Preferably, a semi-circular hole is formed in the upper part of the inner side of each of the induction electrodes, the two semi-circular holes are in butt joint to form a second through hole, and the sealing part can penetrate through the second through hole to stretch to the outside of the outer shell; and the sealing part is in the shape of a cylinder, and the first through hole and the second through hole are both circular holes.

Compared with the prior art, the present disclosure has the following technical effects.

According to the vortex-induced vibration-based piezoelectricity and friction nanometer power generation combined energy collector provided by the present disclosure, the energy collector is vertically fixed in water flow through the fixed plate. When water flows through the cylinder, the flow around a circular cylinder occurs, and a vortex street periodically sheds off. The cylinder can vibrate through vortex shredding. The vibration of the cylinder can drive the liquid inside the solid-liquid type friction nanometer power generation assembly to shake, so that friction is generated between the liquid and the insulating friction inner shell, and then current is generated, and the purpose of energy collection is achieved. In the present disclosure, the vibration generates based on the vortex-induced vibration caused by the flow around a circular cylinder, and the vortex-induced vibration can be generated at a relative low flow speed, so that the energy collection of the water flow at a low flow speed is achieved. Compared with other modes of friction nanometer power generation methods, the solid-liquid type friction nanometer power generation method has extremely low friction coefficients between solid and liquid, and has relatively large solid-liquid effective contact area, so that the method is high in efficiency, and each time of vibration can be effectively utilized. Meanwhile, the cantilever plate deforms through the vibration of the cylinder, and current is generated in the piezoelectric plate through the deformation. Therefore, in the present disclosure, piezoelectric energy collection is combined with friction nanometer energy collection, energy of low-flow-speed water flow is preferably utilized, the advantage of low-frequency energy collection of friction nanometer power generation is fully utilized, the utilization efficiency of water flow energy collection is improved, and the practicability is enhanced.

BRIEF DESCRIPTION OF THE DRAWINGS

To more clearly illustrate the embodiment of the present disclosure or the technical scheme in the prior art, the following briefly introduces the attached figures to be used in the embodiment. Apparently, the attached figures in the following description show merely some embodiments of the present disclosure, and those skilled in the art may still derive other drawings from these attached figures without creative efforts.

Figure 1:
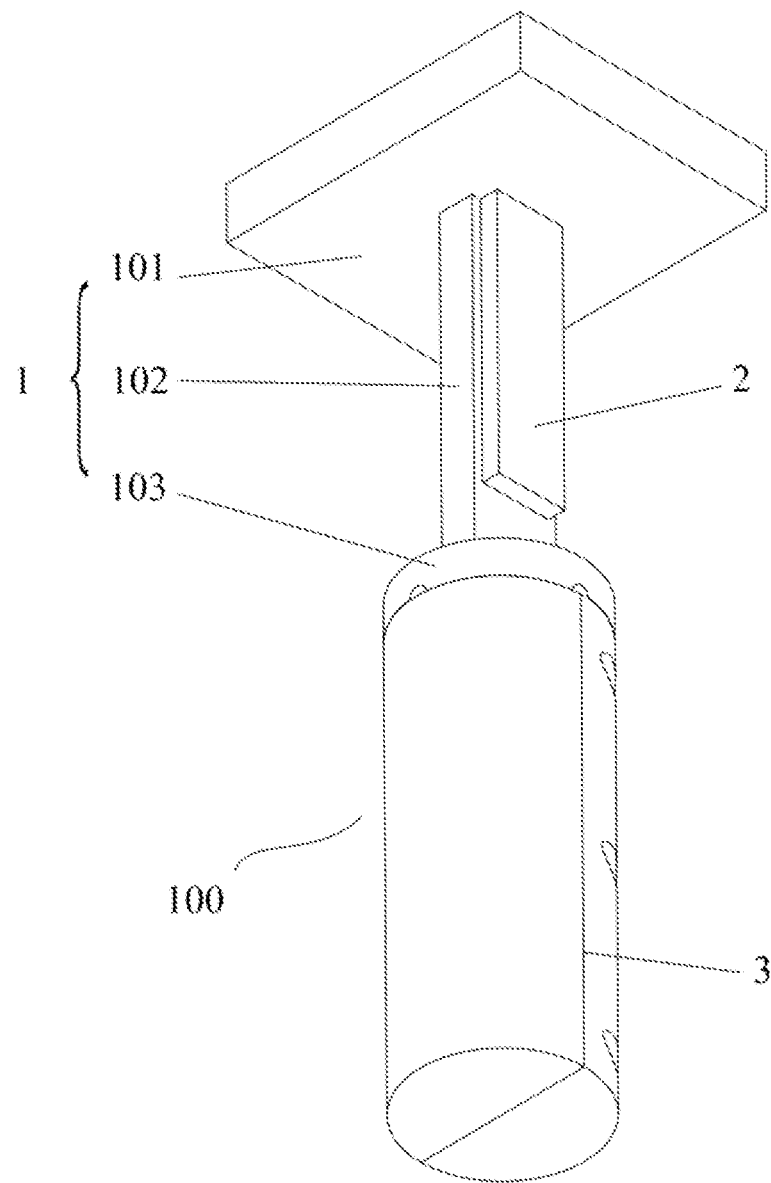
FIG. 1 is a structural schematic diagram of a vortex-induced vibration-based piezoelectricity and friction nanometer power generation combined energy collector provided by the present disclosure.
Figure 2:
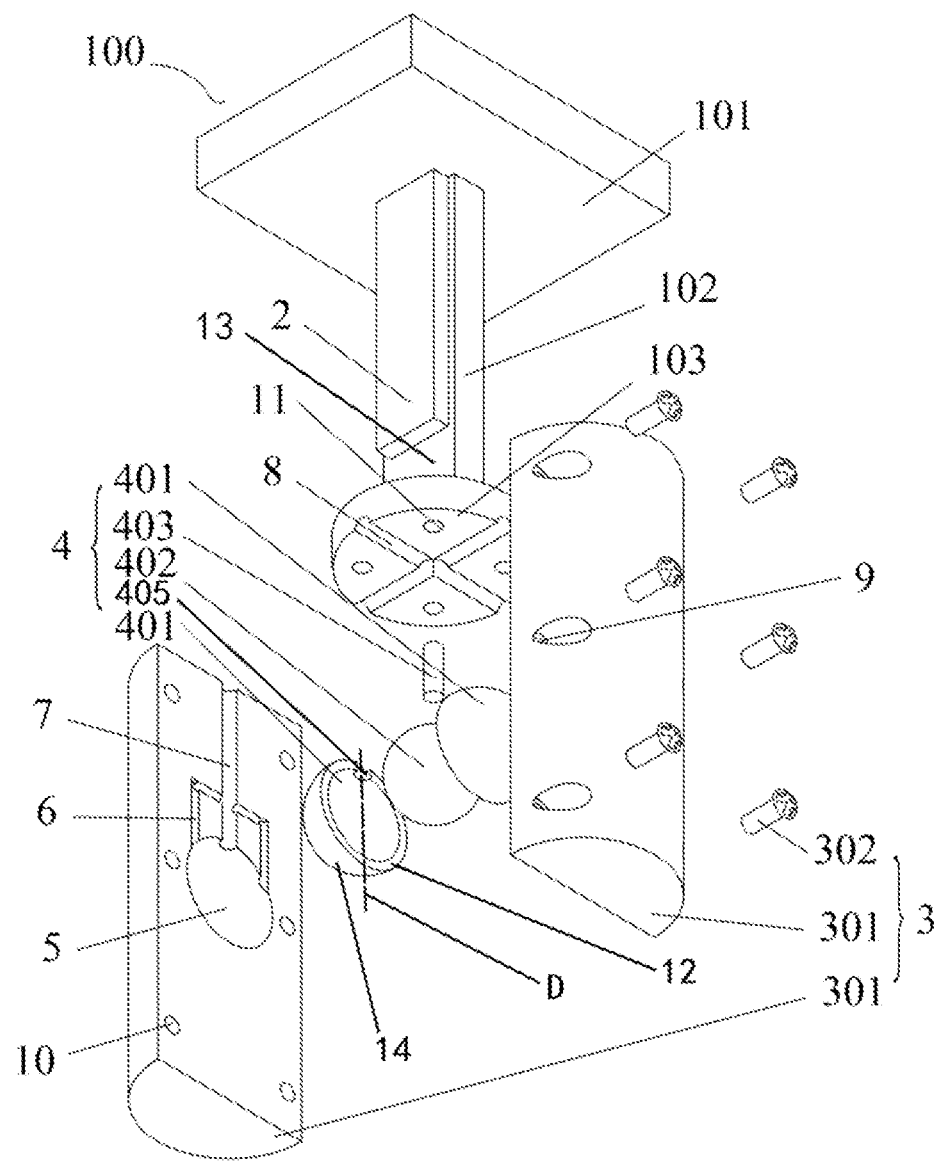
FIG. 2 is an explosive view of a vortex-induced vibration-based piezoelectricity and friction nanometer power generation combined energy collector provided by the present disclosure.

Reference signs in attached figures: 100, vortex-induced vibration-based piezoelectricity and friction nanometer power generation combined energy collector; 1, support frame; 101, fixed plate; 102, cantilever plate; 103, connecting plate; 2, piezoelectric plate; 3, cylinder; 301, semi-cylinder; 302, first connecting bolt; 4, solid-liquid type friction nanometer power generation assembly; 401, induction electrode; 402, insulating friction inner shell; 403, sealing part; 404, first through hole; 405, second through hole; 5, semi-cavity; 6, right-angled groove; 7, vertical groove; 8, cross-shaped channel; 9, first connecting through hole; 10, first threaded hole; 11, second connecting through hole; 12, butt joint face; 13, plane provided with the piezoelectric plate; and 14, half of the induction electrode

DETAILED DESCRIPTION OF THE EMBODIMENTS

The following clearly and completely describes the technical scheme in the embodiments of the present disclosure with reference to the attached figures in the embodiments of the present disclosure. Apparently, the described embodiments are merely a part rather than all of the embodiments of the present disclosure. All other embodiments obtained by those skilled in the art based on the embodiments of the present disclosure without creative efforts shall fall within the protection scope of the present disclosure.

The present disclosure aims to provide a vortex-induced vibration-based piezoelectricity and friction nanometer power generation combined energy collector. Energy collection of low-flow-speed water flow is achieved, the advantage of low-frequency energy collection of friction nanometer power generation is fully utilized, and the utilization efficiency of energy collection is improved.

To make the foregoing objective, features and advantages of the present disclosure clearer and more comprehensible, the present disclosure is further described in detail below with reference to the attached figures and specific embodiments.

As shown in FIG. 1 to FIG. 4, the embodiment provides a vortex-induced vibration-based piezoelectricity and friction nanometer power generation combined energy collector 100. The energy collector comprises a support frame 1, a piezoelectric plate 2, a cylinder 3 and a solid-liquid type friction nanometer power generation assembly 4, wherein the support frame 1 comprises a fixed plate 101, a cantilever plate 102 and a connecting plate 103 which are sequentially connected from top to bottom, the piezoelectric plate 2 is fixed on one side of the cantilever plate 102, the cylinder 3 is mounted at the lower part of the connecting plate 103, a mounting cavity is formed in the cylinder 3, the solid-liquid type friction nanometer power generation assembly 4 comprises an outer shell, an insulating friction inner shell 402 and a sealing part 403, the outer shell is fixed in the mounting cavity, the outer shell comprises two symmetrically arranged induction electrodes 401, insulating layers are arranged between the butt joint faces 12 of the two induction electrodes 401, the included angles between the butt joint faces 12 of the two induction electrodes 401 and the plane 13, provided with the piezoelectric plate 2, of the cantilever plate 102 are not 90°. Specifically, the cantilever plate 102 extends along the vertical direction, and the two induction electrodes 401 are symmetrically arranged relative to the vertical plane. The wire of each induction electrode 401 can penetrate through the cylinder to stretch to the outside, the wire is used for connecting an externally connected load, and the piezoelectric plate 2 is also used for connecting the externally connected load. The insulating friction inner shell 402 is clamped between the two induction electrodes 401. Clamping force is applied to the insulating friction inner shell 402 by the two induction electrodes 401 after mounting, namely, the insulating friction inner shell 402 and the two induction electrodes 401 cannot move relatively. A first through hole 404 is formed in the insulating friction inner shell 402. The insulating friction inner shell 402 is filled with water. Water in the insulating friction inner shell 402 is not in a full state. The sealing part 403 is used for sealing the first through hole 404, and then water in the insulating friction inner shell 402 is prevented from flowing out. Specifically, the sealing part 403 is in interference fit with the first through hole 404.

Specifically, the cylinder 3 comprises a first connecting assembly and two symmetrically arranged semi-cylinders 301, the upper ends of the two semi-cylinders 301 are both mounted on the connecting plate 103, the first connecting assembly is used for connecting the two semi-cylinders 301, a semi-cavity 5 is formed in the inner side of each semi-cylinder 301, and the two semi-cavities 5 are in butt joint to form the mounting cavity.

Specifically, the first connecting assembly comprises a plurality of first connecting bolts 302, a plurality of first connecting through holes 9 are formed in one semi-cylinder 301, a plurality of first threaded holes 10 corresponding to the first connecting through holes 9 are formed in the inner side surface of the other semi-cylinder 301, each first connecting bolt 302 penetrates through one first connecting through hole 9 to be mounted in one first threaded hole 10, and then the connection of the two semi-cylinder 301 is achieved.

In the embodiment, the energy collector further comprises a plurality of second connecting bolts, wherein a plurality of second connecting through holes 11 are formed in the connecting plate 103, a plurality of second threaded holes are formed in the top surface of each semi-cylinder 301, each second connecting bolt penetrates through one second connecting through hole 11 to be mounted in one second threaded hole, and then the connection of the connecting plate 103 and the cylinder 3 is achieved.

In the specific embodiment, the semi-cavity 5 is a semi-spherical cavity, and the two semi-cavities 5 are in butt joint to form a spherical cavity. The induction electrode 401 is in the shape of a semi-spherical shell, and the insulating friction inner shell 402 is in the shape of a spherical shell. The inner diameter of the mounting cavity is the same as the outer diameter of the outer shell, and the inner diameter of the outer shell is the same as the outer diameter of the insulating friction inner shell 402.

Specifically, the lower surface of the connecting plate 103 is provided with a cross-shaped channel 8, a vertical groove 7 is formed in the upper part of the semi-cavity 5, the bottom of the vertical groove 7 communicates with the semi-cylinder 5, two right-angled grooves 6 are symmetrically arranged on the two sides of the semi-cylinder 5, the two ends of each right-angled groove 6 respectively communicate with the semi-cylinder 5 and the vertical groove 7, the two vertical grooves 7 form a vertical channel and the four right-angled grooves 6 form two right-angled channels after the two semi-cylinders 301 are in butt joint, the top of the vertical channel communicates with the middle part of the cross-shaped channel 8, and the two wires respectively pass through the two right-angled channels and stretch to the outside through the vertical channel and the cross-shaped channel 8. The cross-shaped channel 8 comprises four horizontal channels, and the two wires stretch to the outside from the different horizontal channels.

In the specific embodiment, the insulating friction inner shell 402 is made of an FEP material, the wall thickness of the insulating friction inner shell 402 is 50 microns, and the induction electrode 401 is made of copper.

In the specific embodiment, the butt joint face 12 of each induction electrode 401 is provided with the insulating layer, namely, the annular butt joint face 12 of the induction electrode 401 in the shape of a semi-spherical shell is provided with the insulating layer.

Figure 3:
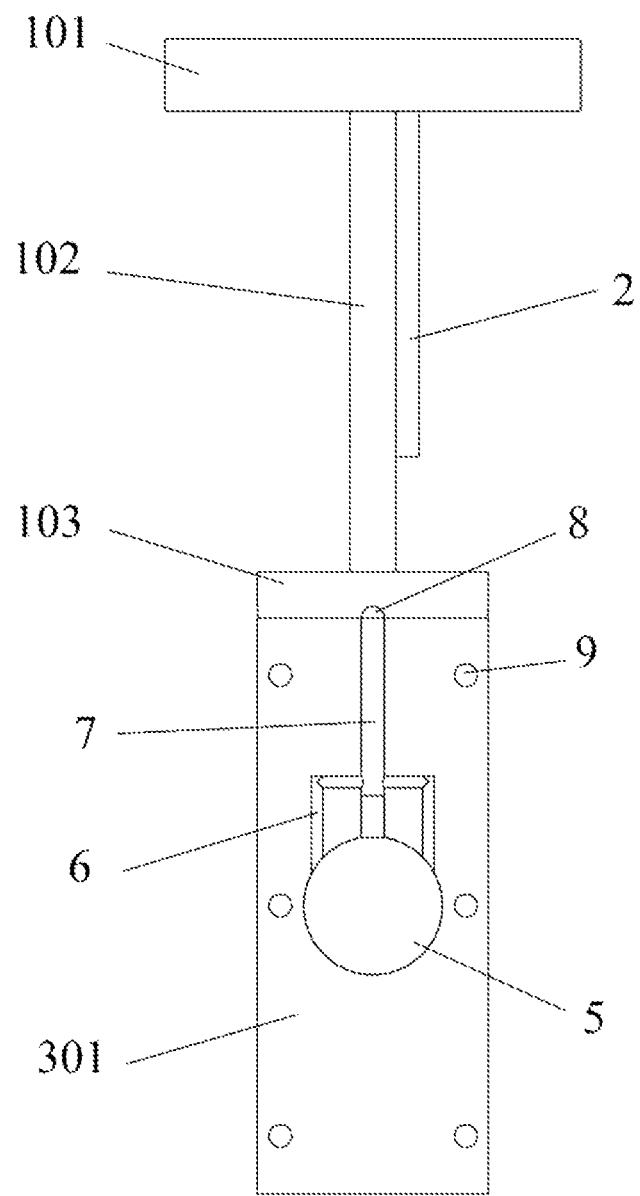
FIG. 3 is a structural schematic diagram of a semi-cylinder in a vortex-induced vibration-based piezoelectricity and friction nanometer power generation combined energy collector provided by the present disclosure.
Figure 4:
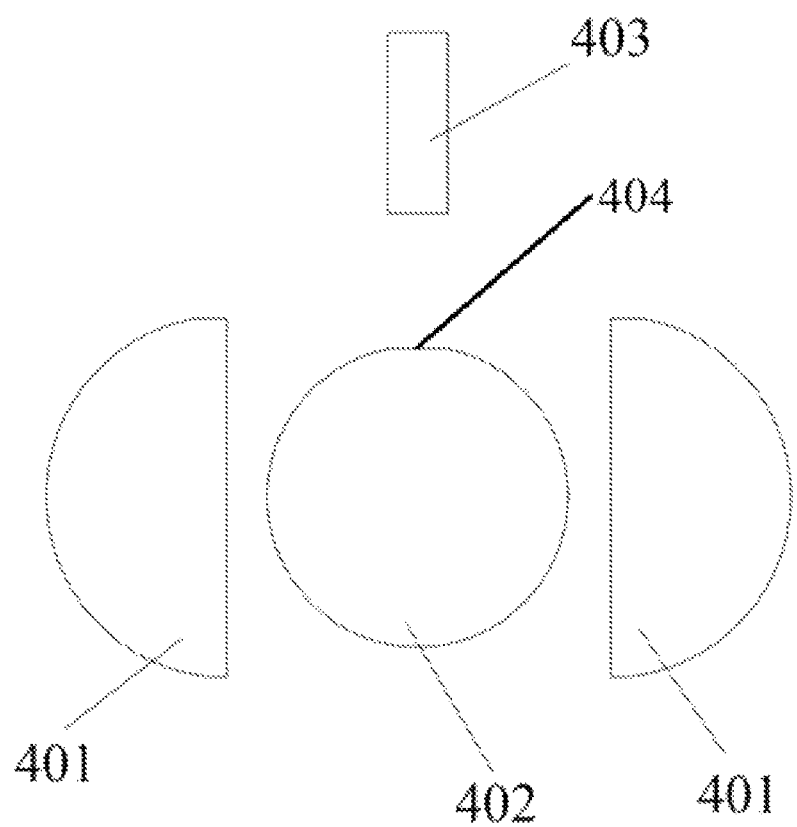
FIG. 4 is a structural schematic diagram of a solid-liquid type friction nanometer power generation assembly in a vortex-induced vibration-based piezoelectricity and friction nanometer power generation combined energy collector provided by the present disclosure.

In the specific embodiment, the butt joint faces 12 of the two induction electrodes 401 and the plane 13, provided with the piezoelectric plate 2, of the cantilever plate 102 are parallel to each other or coplanarly arranged. At the moment, the potential difference generated under the shaking of the cylinder 3 from left to right, and is in an optimal condition. As shown in FIG. 3 and FIG. 4, the butt joint faces 12 of the two induction electrodes 401 and the plane 13, provided with the piezoelectric plate 2, of the cantilever plate 102 are coplanarly arranged. The liquid surface is horizontal in a resting state. Due to the fact that the polarity of water is different from that of the FEP material, the surface of the insulating friction inner shell 402 is carried with negative charges and the water is carried with positive charges. The static electricity is balanced and no electric potential is generated at resting positions. When shaking is generated, the cylinder 3 and the cantilever plate 102 vibrate left and right, water deforms. When the liquid surface surges to the left side, the contact area between the water and the left side is increased, and the contact area between the water and the right side is decreased. Due to the fact that the water is carried with positive charges, when the contact area between the left side and the right side is increased, the positive charges on the left side are increased accordingly, and the positive charges on the right side are decreased accordingly, and potential difference is generated. When the liquid surface surges to the right side in the same way as above, current from right to left is generated, and the generated current flows into the externally connected load through the induction electrodes 401 and the wires. According to the embodiment, the condition that the included angles between the butt joint faces 12 of the two induction electrodes 401 and the plane 13, provided with the piezoelectric plate 2, of the cantilever plate 102 are not 90° is met, so that when the cylinder 3 swings left and right, potential difference is generated between one half of the insulating friction inner shell 402 corresponding to the two induction electrodes 401 and the other half of the insulating friction inner shell 402 corresponding to the two induction electrodes 401.

Specifically, the induction electrodes 401 are bonded in the semi-cavities 5. It needs to be noted that the one-to-one correspondence relation between the induction electrodes 401 and the semi-cavities 5 is not necessarily achieved. In order to meet the condition that the included angles between the butt joint faces 12 of the two induction electrodes 401 and the plane 13, provided with the piezoelectric plate 2, of the cantilever plate 102 are not 90°, when the induction electrodes 401 are mounted, it is possible that the two sides of one induction electrode 401 are bonded in the two semi-cavities 5. In the specific embodiment, the butt joint face 12 of the semi-cylinder 301 and the plane 13, provided with the piezoelectric plate 2, of the cantilever plate 102 are vertical to each other. If the butt joint faces 12 of the two induction electrodes 401 and the plane 13, provided with the piezoelectric plate 2, of the cantilever plate 102 are parallel to each other or coplanarly arranged, half of each of the induction electrodes 401 is bonded in each of the two semi-cavities 5. Each of the two induction electrodes 401 includes two halves 14 bounded by a diameter D, which extends to the semi-circular hole, of the two halves 14., one of the two halves 14 of one of the two induction electrodes 401 is arranged in the semi-cavity 5 of a corresponding one of the two semi-cylinders 301, and one of the two halves 14 of another one of the two induction electrodes 401 is arranged in the semi-cavity of another one of the two semi-cylinders 301, such that the butt joint faces 12 of the two induction electrodes 401 and the plane 13, provided with the piezoelectric plate 2, of the cantilever plate 102 are parallel to each other or coplanarly arranged.

Specifically, the first through hole 404 is formed in the top of the insulating friction inner shell 402. A semi-circular hole is formed in the upper part of the inner side of each induction electrode 401. The two semi-circular holes are in butt joint to form a second through hole 405. The sealing part 403 can penetrate through the second through hole 405 to stretch to the outside of the outer shell, and is arranged in the vertical channel. In the specific embodiment, the sealing part 403 is in the shape of a cylinder, and the first through hole 404 and the second through hole 405 are both circular holes.

In the specific embodiment, the two ends of the cantilever plate 102 are respectively vertically mounted on the fixed plate 101 and the connecting plate 103. In the embodiment, the fixed plate 101 is a rectangular plate, and the connecting plate 103 is a circular plate.

When the energy collector is used, the energy connector is vertically fixed in water flow through the fixed plate 101. When water flows through the cylinder 3, the flow around a circular cylinder occurs, and a vortex street periodically sheds off. Periodical lifting force can be generated on the two sides of the cylinder 3 due to the influence of vortex shedding. The cylinder 3 vibrates through the lifting force. The vibration of the cylinder 3 can drive the liquid inside the solid-liquid type friction nanometer power generation assembly 4 to shake, so that friction is generated between the liquid and the insulating friction inner shell 402, and then current is generated, and the purpose of energy collection is achieved. In the embodiment, the vibration generates based on the vortex-induced vibration caused by the flow around a circular cylinder, and the vortex-induced vibration can be generated at a relative low flow speed, so that the energy collection of the water flow at a low flow speed is achieved, power can be supplied for equipment with low energy consumption, such as sensors on wireless sensor networks, micro electro mechanical systems and unmanned aerial vehicles. Compared with electromagnetic power generator technology, the friction nanometer power generation method has the advantages in the aspect of flow energy collection, especially low-frequency flow energy collection. The friction nanometer power generation method has the characteristics of high energy conversion efficiency, ultrahigh output voltage, rich material sources, simple manufacturing technology, high cost performance, high biocompatibility and the like. Further, compared with other modes of friction nanometer power generation methods, the solid-liquid type friction nanometer power generation method has extremely low friction coefficients between solid and liquid, and has relatively large solid-liquid effective contact area, so that the method is high in efficiency, and each time of vibration can be effectively utilized. Meanwhile, the cantilever plate 102 deforms through the vibration of the cylinder 3, and current is generated in the piezoelectric plate 2 through the deformation.

Therefore, in the embodiment, piezoelectric energy collection is combined with friction nanometer energy collection, energy of low-flow-speed water flow is preferably utilized, the advantage of low-frequency energy collection of friction nanometer power generation is fully utilized, the regenerable low-speed flow energy stored in oceans, rivers and channels can be fully utilized, the utilization efficiency of water flow energy collection is improved, and the practicability is enhanced.

Specific examples are used for illustration of the principles and implementation methods of the present disclosure. The description of the above-mentioned embodiments is used to help illustrate the method and the core principles of the present disclosure; and meanwhile, those skilled in the art can make various modifications in terms of specific embodiments and scope of application in accordance with the teachings of the present disclosure. In conclusion, the content of this specification shall not be construed as a limitation to the present disclosure.

What is claimed is:

1. A vortex-induced vibration-based piezoelectricity and friction nanometer power generation combined energy collector, comprising a support frame, a piezoelectric plate, a cylinder and a solid-liquid type friction nanometer power generation assembly, wherein the support frame comprises a fixed plate, a cantilever plate and a connecting plate which are sequentially connected from top to bottom, the piezoelectric plate is fixed on one side of the cantilever plate, the cylinder is mounted at the lower part of the connecting plate, a mounting cavity is formed in the cylinder, the solid-liquid type friction nanometer power generation assembly comprises an outer shell, an insulating friction inner shell and a sealing part, the outer shell is fixed in the mounting cavity, the outer shell comprises two symmetrically arranged induction electrodes, insulating layers are arranged between butt joint faces of the two induction electrodes, the butt joint faces of the two induction electrodes and a plane; provided with the piezoelectric plate, of the cantilever plate are not perpendicular, a wire of each of the two induction electrodes is configured to penetrate through the cylinder to stretch to the outside, the insulating friction inner shell is clamped between the two induction electrodes, a first through hole is formed in the insulating friction inner shell, the insulating friction inner shell is filled with water, and the sealing part is used for sealing the first through hole.

2. The vortex-induced vibration-based piezoelectricity and friction nanometer power generation combined energy collector according to claim 1, wherein the cylinder comprises a first connecting assembly and two symmetrically arranged semi-cylinders, the upper ends of the two semi-cylinders are both mounted on the connecting plate, the first connecting assembly is used for connecting the two semi-cylinders, a semi-cavity is formed in the inner side of each semi-cylinder, and the two semi-cavities are in butt joint to form the mounting cavity.

3. The vortex-induced vibration-based piezoelectricity and friction nanometer power generation combined energy collector according to claim 2, wherein the first connecting assembly comprises a plurality of first connecting bolts, a plurality of first connecting through holes are formed in one of the semi-cylinders, a plurality of first threaded holes corresponding to the first connecting through holes are formed in the inner side surface of the other of the semi-cylinders, and each of the first connecting bolts penetrates through one of the first connecting through holes to be mounted in one of the first threaded holes.

4. The vortex-induced vibration-based piezoelectricity and friction nanometer power generation combined energy collector according to claim 2, further comprising a plurality of second connecting bolts, wherein a plurality of second connecting through holes are formed in the connecting plate, a plurality of second threaded holes are formed in the top surface of each of the semi-cylinders, and each of the second connecting bolts penetrates through one of the second connecting through holes to be mounted in one of the second threaded holes.

5. The vortex-induced vibration-based piezoelectricity and friction nanometer power generation combined energy collector according to claim 2, wherein the semi-cavity is a semi-spherical cavity, each of the two induction electrodes is in the shape of a semi-spherical shell, and the insulating friction inner shell is in the shape of a spherical shell; the inner diameter of the mounting cavity is the same as the outer diameter of the outer shell, and the inner diameter of the outer shell is the same as the outer diameter of the insulating friction inner shell.

6. The vortex-induced vibration-based piezoelectricity and friction nanometer power generation combined energy collector according to claim 5, wherein a semi-circular hole is formed in the upper part of the inner side of each of the two induction electrodes, the two semi-circular holes are in butt joint to form a second through hole, and the sealing part is configured to penetrate through the second through hole to stretch to the outside of the outer shell; and the sealing part is in the shape of a cylinder, and the first through hole and the second through hole are both circular holes.

7. The vortex-induced vibration-based piezoelectricity and friction nanometer power generation combined energy collector according to claim 6, wherein each of the two induction electrodes comprises two halves bounded by a diameter, which extends to the semi-circular hole, of the two halves; one of the two halves of one of the two induction electrodes is arranged in the semi-cavity of a corresponding one of the two semi-cylinders, and one of the two halves of another one of the two induction electrodes is arranged in the semi-cavity of another one of the two semi-cylinders, such that the butt joint faces of the two induction electrodes and the plane, provided with the piezoelectric plate, of the cantilever plate are parallel to each other or coplanarly arranged.

8. The vortex-induced vibration-based piezoelectricity and friction nanometer power generation combined energy collector according to claim 2, wherein the lower surface of the connecting plate is provided with a cross-shaped channel, a vertical groove is formed in the upper part of the semi-cavity, the bottom of the vertical groove communicates with the semi-cylinder, two right-angled grooves are symmetrically arranged on the two sides of the semi-cylinder, the two ends of each of the right-angled grooves respectively communicate with the semi-cylinder and the vertical groove, the two vertical grooves form a vertical channel and the four right-angled grooves form two right-angled channels after the two semi-cylinders are in butt joint, the top of the vertical channel communicates with the middle part of the cross-shaped channel, and the two wires respectively pass through the two right-angled channels and stretch to the outside through the vertical channel and the cross-shaped channel.

9. The vortex-induced vibration-based piezoelectricity and friction nanometer power generation combined energy collector according to claim 1, wherein the insulating friction inner shell is made of a fluorinated ethylene propylene (FEP) material, and each of the two induction electrodes is made of copper.

10. The vortex-induced vibration-based piezoelectricity and friction nanometer power generation combined energy collector according to claim 1, wherein the butt joint face of each of the two induction electrodes is provided with the insulating layer.

* * * * *